(12) United States Patent
Markel et al.

(10) Patent No.: US 7,711,625 B2
(45) Date of Patent: May 4, 2010

(54) ASYNCHRONOUS EVENTS IN META-DATA DRIVEN INSTRUMENTATION

(75) Inventors: Arieh Markel, Broomfield, CO (US); Peter H. Schow, Longmont, CO (US); Brandon Eugene Taylor, Longmont, CO (US)

(73) Assignee: Oracle America, Inc., Redwood Shores, CA (US)

( * ) Notice: Subject to any disclaimer, the term of this patent is extended or adjusted under 35 U.S.C. 154(b) by 376 days.

(21) Appl. No.: 11/473,100

(22) Filed: Jun. 22, 2006

(65) Prior Publication Data

US 2008/0071651 A1    Mar. 20, 2008

(51) Int. Cl.
*G06Q 40/00* (2006.01)
(52) U.S. Cl. .......................................... 705/36; 705/37
(58) Field of Classification Search ............... 705/36–37
See application file for complete search history.

(56) References Cited

U.S. PATENT DOCUMENTS

| | | | |
|---|---|---|---|
| 6,167,405 A | 12/2000 | Rosensteel, Jr. et al. | |
| 6,999,956 B2 | 2/2006 | Mullins | |
| 7,290,244 B2 | 10/2007 | Peck et al. | |
| 2002/0091702 A1 | 7/2002 | Mullins | |
| 2003/0023518 A1 | 1/2003 | Spriggs et al. | |
| 2003/0163298 A1 | 8/2003 | Odom et al. | |
| 2004/0044793 A1 | 3/2004 | Pauly et al. | |
| 2005/0165881 A1* | 7/2005 | Brooks et al. | 709/200 |
| 2006/0236225 A1 | 10/2006 | Achilles et al. | |
| 2007/0055643 A1 | 3/2007 | Iwatsu et al. | |

OTHER PUBLICATIONS

"CIM Tutorial"; Distributed Management Task Force, Inc. and WBEM Solutions, Inc.; www.wbernsolutions.com/tuitorials/CIM/; 2003; (105 pages).

* cited by examiner

*Primary Examiner*—Thu Thao Havan
(74) *Attorney, Agent, or Firm*—Osha • Liang LLP (57) ABSTRACT

A method for providing management information about an asset includes obtaining a job from a job queue, determining the asset type of the asset from the job, triggering a protocol handler based on a data acquisition (DAQ) definition associated with the asset type and the job, receiving management information about the asset from the protocol handler, identifying at least one registered listener of the management information from the DAQ definition, where at least one registered listener includes an information model class instance, and notifying the at least one registered listener of the management information.

20 Claims, 8 Drawing Sheets

ASYNCHRONOUS EVENTS IN META-DATA DRIVEN INSTRUMENTATION

CROSS-REFERENCE TO RELATED APPLICATIONS

The present application contains subject matter that may be related to the subject matter in the following U.S. patent applications, which are all assigned to a common assignee: "System and Method for Meta-data Driven Instrumentation" Ser. No. 11/472,614 filed on Jun. 22, 2006; "System and Method for Meta-data Driven Instrumentation" Ser. No. 11/472,928 filed on Jun. 22, 2006; "Resource Discovery and Enumeration in the Meta-Data Driven Instrumentation" Ser. No. 11/473,098 filed on Jun. 22, 2006; "System and Method for Object-Oriented Meta-Data Driven instrumentation" Ser. No. 11/473,099 filed on Jun. 22, 2006; "System and Method for Native-Asset-Interface Libraries for Instrumentation" Ser. No. 11/472,852 filed on Jun. 22, 2006; "System and Method for Efficient Meta-Data Driven Instrumentation" Ser. No. 11/472,660 filed on Jun. 22, 2006; and "System and Method for Mapping between Instrumentation and Information Model" Ser. No. 11/473,197 filed on Jun. 22, 2006.

BACKGROUND

A network corresponds to an interconnection of more than one computer system. For example, one type of network is a home network. A home network may correspond to two or more personal computers that can exchange data with each other and the Internet. Different types of networks exist throughout society. For example, large organizations often have data centers, servers, and various personal computer systems to exchange information between users, and to provide processing power to a single user.

In order to provide such functionality, a network includes various types of hardware and software. For example, the hardware includes the computer systems (personal computers, servers, and other such computing devices), network interface hardware, interconnection mediums (e.g., cables, wireless signals, etc.) routers, switches, hubs, and other such hardware. The software is instructions for providing the functionality of the network. For example, the software may include operating systems, network specific applications, user applications, server applications, etc.

In order to keep a network operating properly, the network must be managed. Managing a network involves managing the different resources (i.e., hardware and software) of the network. Typically, a resource can be managed through an application programming interface (API) of the resource. An application programming interface is the interface that a resource provides in order to allow management requests for service and management data to be made of the resource by management applications. Specifically, a management application that has knowledge of the application programming interface of the resource can manage the resource by accessing the different functions and data available through the application programming interface of the resource.

SUMMARY

In general, in one aspect, the invention relates to a method for providing management information about an asset. The method includes obtaining a job from a job queue, determining the asset type of the asset from the job, triggering a protocol handler based on a data acquisition (DAQ) definition associated with the asset type and the job, receiving management information about the asset from the protocol handler, identifying at least one registered listener of the management information from the DAQ definition, wherein at least one registered listener that includes an information model class instance, and notifying the at least one registered listener of the management information.

In general, in one aspect, the invention relates to a system for providing management information about an asset. The system includes a thread of a factory manager configured to obtain a job from a job queue, determine the asset type of the asset from the job, trigger a protocol handler based on a DAQ definition associated with the asset type and the job, and receive management information about the asset from the protocol handler, and a DAQ manager configured to identify at least one registered listener of the management information from the DAQ definition, wherein the at least one registered listener that includes an information model class instance, and notify the at least one registered listener of the management information.

In general, in one aspect, the invention relates to a distributed computer system having a plurality of nodes for performing a method. The distributed computer system includes obtaining a job from a job queue, determining the asset type of the asset from the job, triggering a protocol handler based on a DAQ definition associated with the asset type and the job, receiving management information about the asset from the protocol handler, identifying at least one registered listener of the management information from the DAQ definition, wherein the at least one registered listener that includes an information model class instance, and notifying the at least one registered listener of the management information, wherein the protocol handler and the at least one registered listener are distributed across one or more of the plurality of nodes.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for managing assets. Specifically, embodiments of the invention provide a mechanism for managing assets of different asset types through a common interface. Managing an asset includes monitoring the asset, actively managing the asset, registering the asset, or performing any other function on the asset. More specifically, embodiments of the invention abstract the application programming interface from the management data and functionality associated with a single asset. Using the abstraction, a management application and information model can manage an asset without knowing the application programming interface of the asset.

Further, embodiments of the invention provide a mechanism whereby management application may receive notifications of management information by subscribing to the management information. Moreover, regardless of whether the application programming interface of the asset supports asynchronous notification, embodiment of the invention obtain the management information from the asset and send the management information to a management application.

Figure 1:
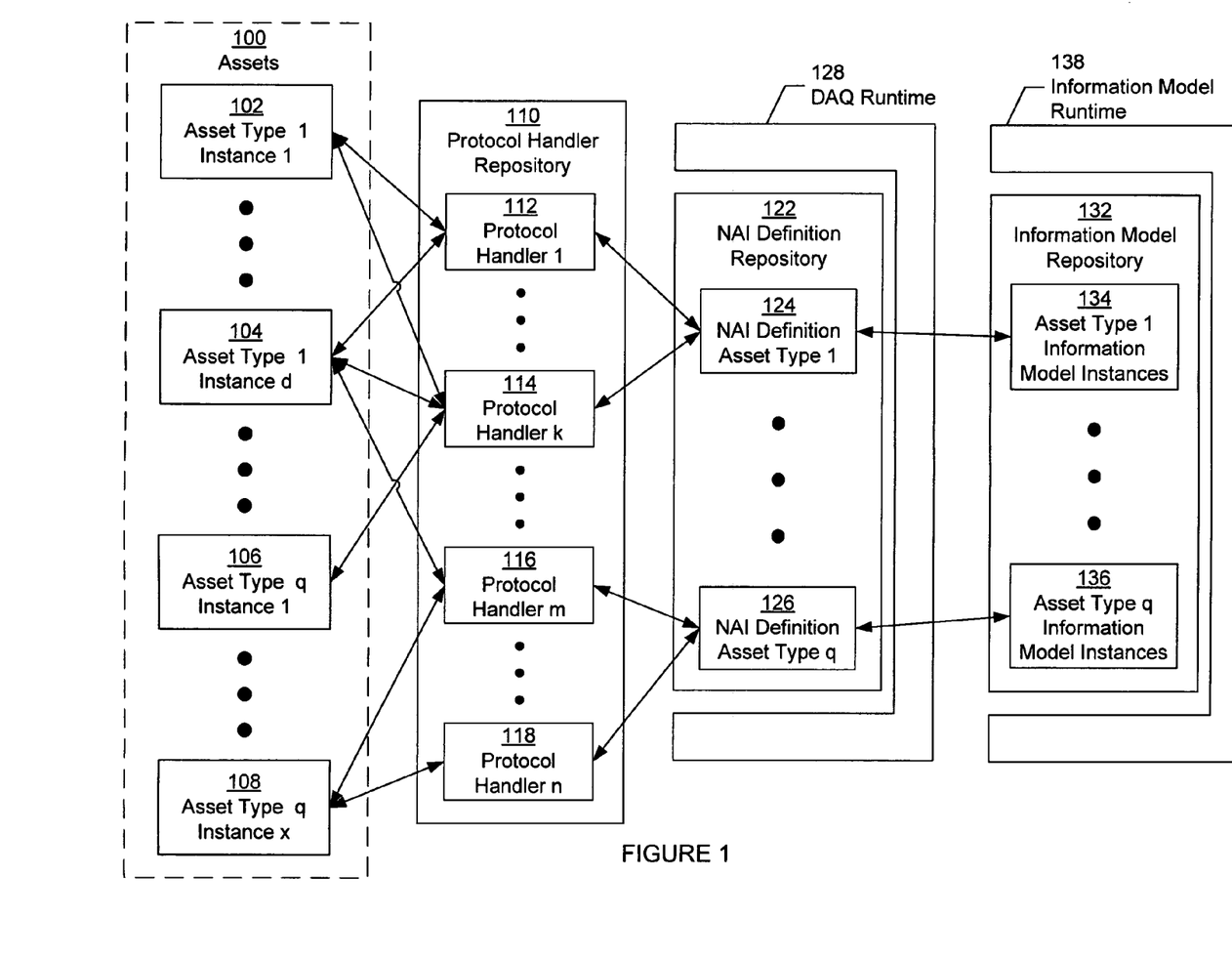
FIG. 1 shows a schematic diagram of a system for managing assets in accordance with one or more embodiments of the invention.

FIG. 1 shows a schematic diagram of a system for managing assets in accordance with one or more embodiments of the invention. As shown in FIG. 1, the system includes assets (100), a protocol handler repository (110), a native asset interface (NAI) definition repository (122), a data acquisition (DAQ) runtime (128), an information model repository (132), and an information model runtime (138) in accordance with one or more embodiments of the invention. Each of these components is described below.

An asset (100) corresponds to any type of actual manageable resource in accordance with one or more embodiments of the invention. Specifically, asset (100) corresponds to the resources that are the object of the management. For example, an asset may correspond to software (e.g., operating system, database application, network application, or any other type of software) or hardware (e.g., computer systems, routers, switches, etc.).

One attribute of an asset (100) corresponds to the asset type. An asset type specifies a group of characteristics of the asset. The asset type may specify a type of operating system, a type of hardware, a type of server, etc. For example, if the asset is an operating system, then the asset type for the asset may correspond to a particular operating system, such as Solaris™ developed by Sun Microsystems, Inc.™ (a trademark of Sun Microsystems, Inc. located in Santa Clara, Calif.). In one or more embodiments of the invention, assets that have the attribute of the same asset type have the same native asset interface (NAI) for managing the resources of the asset.

An NAI corresponds to a collection of instrumentation and control interfaces that is provided by the asset for the purposes of managing the asset. For example, an NAI may correspond to command line programs, files, simple network management protocol (SNMP), Intelligent Platform Management Interface (IPMI), etc. The NAI for any asset in the assets (100) may or may not include provisions for asynchronous event notifications. Specifically, the API provided by the NAI may or may not allow for the DAQ to receive management information from the API without prior request.

An asset type may have one or more instances (e.g., asset type 1/instance 1 (102), asset type 1/instance d (104), asset type q/instance 1 (106), asset type q /instance x (108)) of the asset type. In particular, assets that are of the same asset type are called instances of the asset type. For example, as shown in FIG. 1, asset type 1 has at least two instances (e.g., asset type 1/instance 1 (102) and asset type 1/instance d (104)), while asset type q has at least two separate instances (e.g., asset type q/instance 1 (106) and asset type q/instance x (108)).

Continuing with FIG. 1, the system also includes a protocol handler repository (110) in accordance with one or more embodiments of the invention. A protocol handler repository (110) corresponds to a storage unit, such as a file system or library, for protocol handlers (e.g., protocol handler l (112), protocol handler k (114), protocol handler m (116), protocol handler n (118)). A protocol handler (e.g., protocol handler l (112), protocol handler k (114), protocol handler m (116), protocol handler n (118)) corresponds to a logical component that includes functionality to directly access the data, methods, and functions of an asset (100). Specifically, the protocol handler (e.g., protocol handler l (112), protocol handler k (114), protocol handler m (116), protocol handler n (118) includes functionality to use the NAI of the asset in order to manage the asset.

In one or more embodiments of the invention, each protocol handler (e.g., protocol handler l (112), protocol handler k (114), protocol handler m (116), protocol handler n (118)) is designed for a single protocol or NAI. For example, one protocol handler (e.g., protocol handler l (112), protocol handler k (114), protocol handler m (116), protocol handler n (118)) may include functionality to manage assets that use the SNMP, another protocol handler may be designed for IPMI, while another protocol handler may be designed for assets that are managed through Integrated Light Out Management (ILOM) developed by Sun Microsystems, Inc., and another protocol handler may manage assets that use the Network Time Protocol (NTP). In one or more embodiments of the invention, only one protocol handler exists for any single protocol. Those skilled in the art will appreciate that multiple protocol handlers may exist for any single protocol for redundancy purposes.

Because the protocol handlers are associated with a single protocol, each protocol handler (e.g., protocol handler l (112), protocol handler k (114), protocol handler m (116), protocol handler n (118)) is connected to one or more asset instance (e.g., asset type 1/instance 1 (102), asset type 1/instance d (104), asset type q/instance 1 (106), asset type q/instance x (108)) in accordance with one or more embodiments of the invention. Specifically, assets (100) that have at least one common NAI are connected to the same protocol handler regardless of whether the assets are of the same asset type.

Similarly, each asset instance (e.g., asset type 1/instance 1 (102), asset type 1/instance d (104), asset type q/instance 1 (106), asset type q/instance x (108)) is connected to one or more protocol handlers (e.g., protocol handler l (112), protocol handler k (114), protocol handler m (116), protocol handler n (118)) in accordance with one or more embodiments of the invention. Specifically, each asset instance (e.g., asset type 1/instance 1 (102), asset type 1/instance d (104), asset type q/instance 1 (106), asset type q/instance x (108)) may be accessed by one or more protocol handlers (e.g., protocol handler l (112), protocol handler k (114), protocol handler m (116), protocol handler n (118)) that correspond to the protocols for managing the asset.

In addition to the protocol handler repository (110), the system includes a NAI definition repository (122). A NAI definition repository (122) corresponds to a storage unit, such as a library or file system, for NAI definitions (e.g., NAI definition asset type 1 (124), NAI asset type q (126)). An NAI definition (e.g., NAI definition asset type 1 (124), NAI asset type q (126)) corresponds to an abstraction of the management components of an asset in accordance with one or more embodiments of the invention. Specifically, an NAI definition stipulates how data acquisition is performed and how data is populated for access. Moreover, an NAI definition (e.g., NAI definition asset type 1 (124), NAI asset type q (126)) provides a common interface for defining the manageable components of the different assets. In one or more embodiments of the invention, each asset type has a single NAI definition (e.g., NAI definition asset type 1 (124), NAI asset type q (126)). Accordingly, the same NAI asset type definition may be used for multiple asset instances of the same asset type.

A data acquisition (DAQ) runtime (128) corresponds to logical component that includes functionality to use a runtime binding of the NAI definition to manage the asset. Moreover, in one or more embodiments of the invention, the DAQ runtime (128) corresponds to the main focus of the system. Specifically, the DAQ runtime includes functionality to operate on NAI definitions (e.g., NAI definition asset type 1 (124), NAI asset type q (126)). The DAQ runtime (128), and the NAI definitions (e.g., NAI definition asset type 1 (124), NAI asset type q (126)) are described in more detail in FIG. 3.

Continuing with FIG. 1, the NAI definitions (e.g., NAI definition asset type 1 (124), NAI asset type q (126)) are connected to an information model that includes the information model repository (132) and the information model runtime (138). An information model corresponds to a public interface for assets (100). The information model repository (132) corresponds to a storage unit for information model instances (e.g., asset type 1 information model instances (134), asset type q information model instances (136)). The information model instances (e.g., asset type 1 information model instances (134), asset type q information model instances (136)) are described in more detail in FIG. 2.

Continuing with the information model repository (132) of FIG. 1, the information model runtime (138) includes functionality to provide an execution environment for the information model repository (132). Specifically, the information model runtime (138) corresponds to the classes and methods of the information model during execution.

Figure 2:
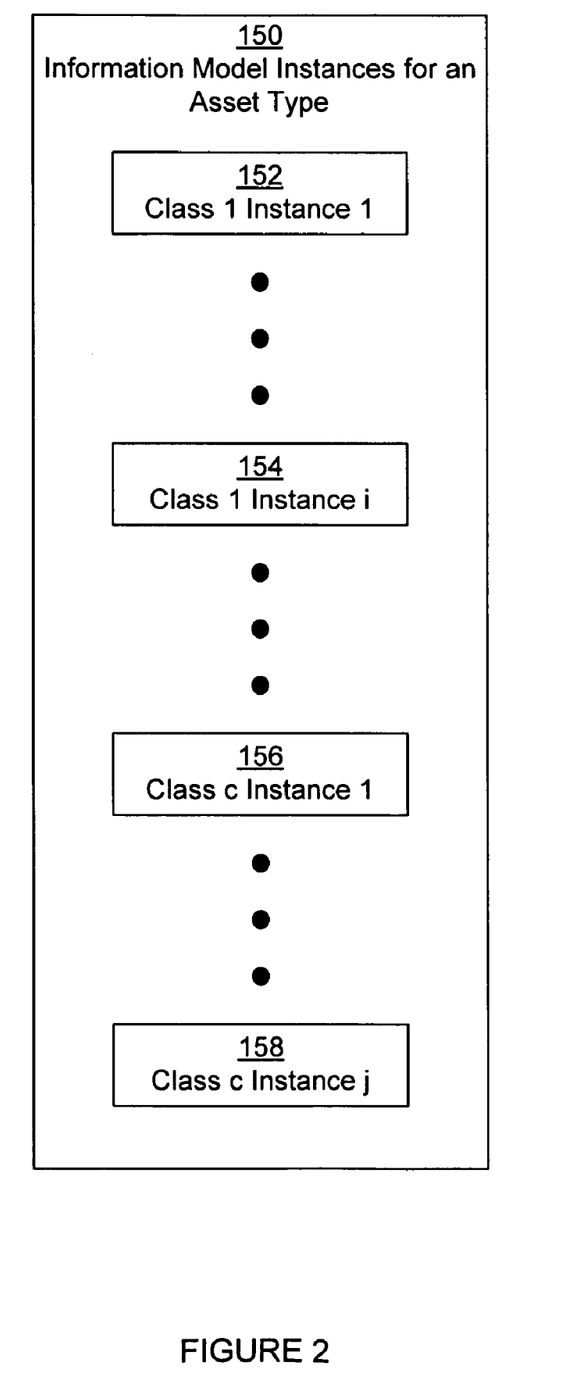
FIG. 2 shows a schematic diagram of information model instances for an asset type in accordance with one or more embodiments of the invention.

FIG. 2 shows a schematic diagram of information model instances for an asset type (150) in accordance with one or more embodiments of the invention. As shown in FIG. 2, each information model for an asset type includes multiple classes. A class corresponds to a collection of methods and properties that are common to a particular kind of component of the asset type. The method corresponds to the methods that can be used for managing an asset. The properties correspond to the manageable variables of an asset. For example, if the asset type is a particular type of server, a class may correspond to properties and methods for managing the operating system component for the particular type of server.

Each class includes multiple class instances (e.g., class 1/instance 1 (152), class 1/instance i (154), class c/instance 1 (156), class c/instance j (158)) in accordance with one or more embodiments of the invention. A class instance (e.g., class 1/instance 1 (152), class 1/instance i (154), class c/instance 1 (156), class c/instance j (158)) corresponds to an abstraction of an asset type instance in information model format. In one or more embodiments of the invention, the information model format corresponds to common information model (CIM) format (developed by Distributed Management Task Force, Inc. located in Portland, Oreg.). As shown in FIG. 2, the class instances (e.g., class 1/instance l (152), class 1/instance i (154), class c/instance 1 (156), class c/instance j (158)) for the information model may not be in a one to one relationship with the instances of the asset type for the class. In particular, some asset type instances may not have a corresponding instance for a particular information model class.

Each information model class instance (e.g., class 1/instance 1 (152), class l/instance i (154), class c/instance 1 (156), class c/instance j (158)) is connected to a mapping specification (not shown) in accordance with one or more embodiments of the invention. The mapping specification includes functionality to map between the information model format and the DAQ format of the DAQ runtime. Accordingly, an information model class instance (e.g., class 1/instance 1 (152), class 1/instance i (154), class c/instance 1 (156), class c/instance j (158)) can manage virtually any asset without knowledge of the specific protocols used to manage the asset.

Alternatively, in one or more embodiments of the invention, each information model class instance (e.g., class 1/instance 1 (152), class 1/instance (154), class c/instance 1 (156), class c/instance j (158)) may include the information required to format communication in the DAQ format in order to directly communicate with the DAQ runtime in accordance with one or more embodiments of the invention.

Figure 3:
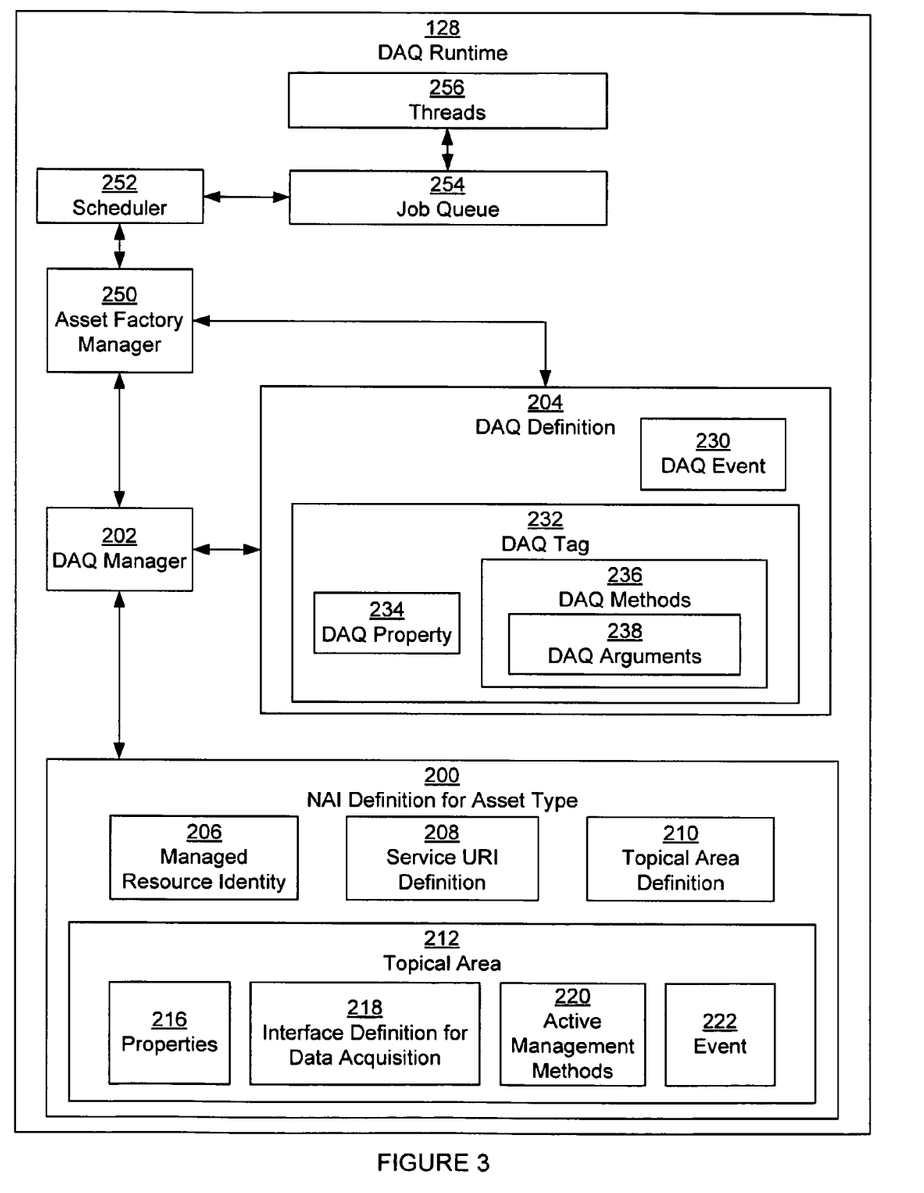
FIG. 3 shows a schematic diagram of a data acquisition runtime used for managing assets in accordance with one or more embodiments of the invention.

FIG. 3 shows a schematic diagram of a DAQ runtime (128) used for managing assets in accordance with one or more embodiments of the invention. Moreover, the DAQ runtime (128) includes functionality to asynchronously provide management information to classes of the information model. As shown in FIG. 3, the DAQ runtime (128) includes an NAI definition for the asset type (200), a DAQ manager (202), a DAQ definition (204), an asset factory manager (250), a scheduler (252), a job queue (254), and threads (256) in accordance with one or more embodiments of the invention. Each of these components is described below.

An NAI definition for an asset type (200) corresponds to a description of the NAI for the asset. Specifically, for each manageable component of the asset type, the NAI definition defines how to manage the component using the NAI of the component. In one or more embodiments of the invention, the NAI definition includes a scheme or protocol (e.g., SNMP, IPMI, etc.), and a part that defines how to execute the NAI in context of the protocol. For example, suppose that information about a computer system are gathered by a command line command "uname-a." Then the NAI definition may specify that the protocol is a shell, the location of the computer system, and the command "uname-a."

In one or more embodiments of the invention, the NAI definition for the asset type (200) is defined using extensible markup language (XML). Specifically, the aforementioned components of the NAI definition are denoted by XML tags. Moreover, in one or more embodiments of the invention, the NAI definition complies with a predefined XML schema. The NAI definition for the asset type (200) includes a managed resource identity (206), a service URI definition (208), a topical area definition (210), and a topical area (212). Each of these components is described below.

The managed resource identity (206) corresponds to a definition of the asset type. Specifically, the managed resource identity (206) uniquely identifies the asset type in the NAI repository (not shown). In one or more embodiments of the invention, the managed resource identity (206) corresponds to an alpha-numeric identifier.

In addition to the managed resource identity (206), the NAI definition for the asset type (200) includes a service URI definition (208). The service URI definition (208) denotes how instances of the asset are enumerated. Specifically, the service URI definition (208) defines the scheme and method for identifying all instances of the asset type. For example, the service URI definition (208) may specify an enumeration service, a database, a discovery protocol, or any other mechanism for enumerating instances of an asset type.

The NAI definition for the asset type (200) also includes a topical area definition (210) in accordance with one or more embodiments of the invention. A topical area definition (210) identifies the different topical areas that can be managed for an asset type. For example, if the asset type is a computer system, then the topical area definition (210) may specify that the different manageable components of the asset type or topical areas of the asset type. For example, the topical areas may correspond to operating system, storage, networking, executing processes, or other such area.

In accordance with one or more embodiments of the invention, each topical area includes a topical area definition (212). The topical area definition (212) corresponds to a specification for managing the topical area. The topical area definition (212) includes properties (216), interface definitions for data acquisition (218), active management methods (220), and events (222). Each of these components is described below.

Properties (216) correspond to the information in the topical area about the asset type. Specifically, a property (216) corresponds to the information and data that can be set and obtained from an asset. For example, if the topical area corresponds to storage, then the properties may correspond to storage space, partitioning, amount of used space, etc. In one or more embodiments of the invention, the name of a property is unique within the namespace of the topical area. Further, in one or more embodiments of the invention, each property (216) includes a plurality of attributes. For example, the attributes of the property (216) may correspond to the name, a description, whether the property is able to be changed, the data type of values of the property, etc.

The interface definition for data acquisition (218) identifies how the properties (216) are populated in accordance with one or more embodiments of the invention. Specifically, the interface definition for data acquisition (218) specifies the scheme and method in the context of the scheme that is used to manage the asset in relation to the property. For example, the interface definition for data acquisition may correspond to snmp://target@host:port/1.3.6.2.1.1.1.*. The SNMP portion shows the scheme that is used to obtain a property as required by the NAI for the property is SNMP. The remainder portion of the example interface definition corresponds to the location for obtaining and setting the property on the asset.

Continuing with FIG. 3, the topical area definition (212) also includes active management methods (220). The active management methods (220) correspond to information about the methods that the NAI for the asset type provides in order to manage the asset by modification. For example, a method from the NAI may correspond to reset a particular value. The active management methods (220) identify how the value is reset. In one or more embodiment of the invention, active management methods (220) provide information for invoking the method for the NAI of the asset type.

Another component of the topical area definition (212) is an event (222). An event (222) corresponds to information for subscribing for notifications. Specifically, the NAI for the asset type generally includes mechanisms for receiving periodic notifications or only notification of changes. An event (222) corresponds to the definition of how to turn on the NAI for the notifications. For example, an event (222) may correspond to information about how to register for information about temperature.

In addition to the NAI definition for the asset type (200), the DAQ runtime (128) includes a DAQ definition (204) in accordance with one or more embodiments of the invention. A DAQ definition (204) corresponds to a runtime image of the NAI definition for the asset type (200). Specifically, the DAQ definition (204) corresponds to a runtime binding of the NAI definition for the asset type (200). For example, whereas in one or more embodiments of the invention, the NAI definition for the asset type (200) is in XML language, the DAQ definition (204) may correspond to an object oriented programming language. More specifically, a binding compiler (not shown) includes functionality to translate XML schema into one or more Java™ classes without requiring the developer to write complex parsing code. Moreover, in one or more embodiments of the invention, each DAQ definition (204) has the same names for the methods regardless of the different NAI definitions. Accordingly, the DAQ definition provides a common interface for each of the different asset types of the NAI definitions. In accordance with one or more embodiments of the invention, the DAQ definition (204) includes a DAQ event (230) and a DAQ tag (232).

A DAQ event (230) corresponds to a runtime binding of an event (222). Specifically, a DAQ event (230) includes functionality to compare an old value and new value for a property corresponding to the DAQ event (230). Further, the DAQ event includes functionality to register listeners for the DAQ event (230) and inform registered listeners of a current status (e.g., changes between the old and new value, no change, etc.) of the property associated with the DAQ event (230).

A DAQ tag (232) corresponds to a runtime image of the topical area definition (212). Accordingly, those skilled in the art will appreciate that a DAQ tag (232) exists for each topical area definition (212) in accordance with one or more embodiments of the invention. The DAQ tag (232) includes a DAQ property (234) and DAQ methods (236).

A DAQ property (234) corresponds to a runtime image of the properties definition (216). Similarly, DAQ methods (236) correspond to a runtime image of the active management methods (220). The DAQ methods (236) include DAQ arguments (238). The DAQ arguments (238) correspond to the arguments required by the NAI methods of the asset. For example, if the NAI method for an asset corresponding to storage is to change the partitioning of the storage, then the DAQ arguments for a DAQ method of partitioning may specify how the storage devised is partitioned.

A DAQ manager (202) is connected to the DAQ definition (204) and the NAI definition for an asset type (200). The DAQ manager (202) corresponds to a logical engine that includes functionality to perform a runtime binding of the NAI definition for the asset type (200) with the DAQ definition (204) in accordance with one or more embodiments of the invention. Further, the DAQ manager (202) includes functionality to identify the DAQ definition (204) for a given management request and trigger the operations required using the DAQ definition (204) for managing the asset according to the management request. Specifically, the DAQ manager includes functionality to trigger an operation on an asset factory (250) in accordance with one or more embodiments of the invention.

Accordingly, the DAQ manager (202) is connected to at least one asset factory manager (250) in accordance with one or more embodiments of the invention. An asset factory manager (250) corresponds to a logical component. In one or more embodiments of the invention, an asset factory exists for each DAQ definition. The asset factory manager (250) includes functionality to maintain information about individual asset instance. Specifically, rather than the granularity of the information on just the asset type 1evel, the granularity for information of the asset factory manager (250) corresponds to individual asset instances in accordance with one or more embodiments of the invention.

Further, the asset factory manager includes functionality to invoke, subscribe, and unsubscribe listeners to the management information for assets. A listener corresponds to any component, such as an information model class, management application, another asset, etc. that receives notifications of events. The notifications may correspond to actual management information, changes in management information, or only to a notice that new management information has been obtained. In one or more embodiments of the invention, in a subscription request to events, a listener may be subscribed to individual properties, DAQ tags, DAQ definitions, and may have a specified frequency for receiving event notification.

Continuing with the asset factory manager (250), the asset factory manager further includes functionality to invoke an event containing a management request. A scheduler (252) is connected to the asset factory manager (250) in accordance with one or more embodiments of the invention. A scheduler includes functionality to create a job in a job queue (254). Specifically, the scheduler corresponds to a logical component that includes functionality to identify when a job should occur based on the event and enqueue the job in the job queue (254)

A job queue (254) corresponds to any type of data structure (e.g., object-oriented queue, vector, tree, heap, etc.) and any storage mechanism (e.g., database, file(s), etc.) for storing requests until the jobs are processed (i.e., removed from the queue). The job queue (254) allows for asynchronous processing of requests. Further, in one or more embodiments of the invention, the job queue (254) is a priority-based. Specifically, requests are processed in a certain order, such as first in first out, smallest object processed first, etc. For example, a job for a security update may have a higher priority than a job for user-level application functionality updates.

Continuing with FIG. 3, the job queue (254) is connected to multiple threads (256) in accordance with one or more embodiments of the invention. A thread (256) corresponds to a sequence of instructions in execution in accordance with one or more embodiments of the invention. Those skilled in the art will appreciate that thread may correspond to the instructions being processed, or when the thread (256) is asleep or halted. Multiple threads (256) may execute the same program in parallel. A thread (256) includes functionality to remove jobs from the job queue and process the request. In one or more embodiments of the invention, the threads (256) further include functionality to execute the instructions of a protocol handler or instigate another thread (not shown) to execute the instructions of a protocol handler.

Those skilled in the art will appreciate that while FIG. 3 has been described with the threads (256), job queue (254), and scheduler (252) as part of the DAQ runtime, the aforementioned components may exist virtually anywhere in the system, such as with the protocol handler repository (described above in FIG. 1)

For example, in one exemplary implementation of one or more embodiments of the invention, the DAQ runtime includes functionality to process request of type "get attributes", "set attributes", "invoke methods", and manage "event subscription" requests. When processing the aforementioned requests, the runtime includes functionality to schedule an event, add a job to a job queue at the time of the scheduled event, and use a thread accessing the job queue to process the request asynchronously and/or on a time specified by the request in accordance with one or more embodiments of the invention. The DAQ runtime processing of the requests in the exemplary implementation is described below.

In one or more embodiments of the invention, in response to a "get attribute" request the runtime includes functionality to perform the following. Specifically, in response to the "get attribute" request, the runtime includes functionality to determine the DAQ tag where the attribute of interest is located by accessing the DAQ definition associated with the asset. The DAQ definition can be located via the assets NAI specification document, which is bound at execution time into the DAQ definition object. Next, the runtime includes functionality to obtain from the DAQ definition object the URI associated with the DAQ tag in accordance with one or more embodiments of the invention. Specifically, the DAQ tag includes the URI definition for the obtaining value of the attribute from the NAI of the asset in accordance with one or more embodiments of the invention. After obtaining the necessary information for identifying the NAI for the asset, the runtime includes functionality to query the protocol handler repository to obtain the protocol handler that corresponds to the URI associated with the DAQ tag in accordance with one or more embodiments of the invention. Finally, the runtime includes functionality to perform an invocation of the protocol handler using a thread accessing the job queue to obtain the value of the required attribute.

Continuing with the example, in one or more embodiments of the invention, in response to a "set attribute" request the runtime includes functionality to perform the following. Specifically, in response to the "set attribute" request, the DAQ runtime includes functionality to determine the location of the DAQ tag for setting the attribute of interest. Determining the location may be performed by accessing the DAQ definition object associated with the asset in accordance with one or more embodiments of the invention. Next, the DAQ runtime includes functionality to obtain the URI associated with the DAQ tag from the DAQ definition object for the attribute in accordance with one or more embodiments of the invention. After obtaining the necessary information to set the attribute, the DAQ runtime includes functionality to query the protocol handler repository to obtain the protocol handler that corresponds to the URI associated with the DAQ tag in accordance with one or more embodiments of the invention. Finally, the DAQ runtime performs invocations of the protocol handler found in the library to set the attribute with the requested value.

Continuing with the example, in one or more embodiments of the invention, in response to an invoke method request the runtime includes functionality to perform the following. Specifically, in response to the invoke method request, the DAQ runtime includes functionality to determine the DAQ tag where the method of interest is located by accessing the DAQ definition associated with the asset. After determining the DAQ tag, the DAQ runtime includes functionality to obtain the URI associated with the method to be invoked from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a method invocation operation on the protocol handler that executes the API for the method to be invoked.

Lastly, in the example implementation, when the DAQ runtime receives an "event subscription" request, the DAQ runtime includes functionality to determine the DAQ tag for the subscription event of interest is located by accessing the DAQ definition associated with the asset. After determining the DAQ tag, the DAQ runtime includes functionality to register the sender of the request as a registered listener and obtain the URI associated with the DAQ tag from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a subscription request operation using the protocol handler to obtain notification of events through the NAI of the asset if the NAI of the asset supports asynchronous notification of events or to poll the asset if the NAI does not support asynchronous notification. When an event notification is received, the DAQ runtime includes functionality to notify the registered listener(s) of the event.

As shown in the above example, the common interface through the DAQ allows for an information model to perform virtually any management functions on the asset that are exposed through the NAI of the asset without having the NAI of the asset in accordance with one or more embodiments of the invention. Specifically, using the aforementioned requests, virtually any management operation can be performed in accordance with one or more embodiments of the invention.

Figure 4:
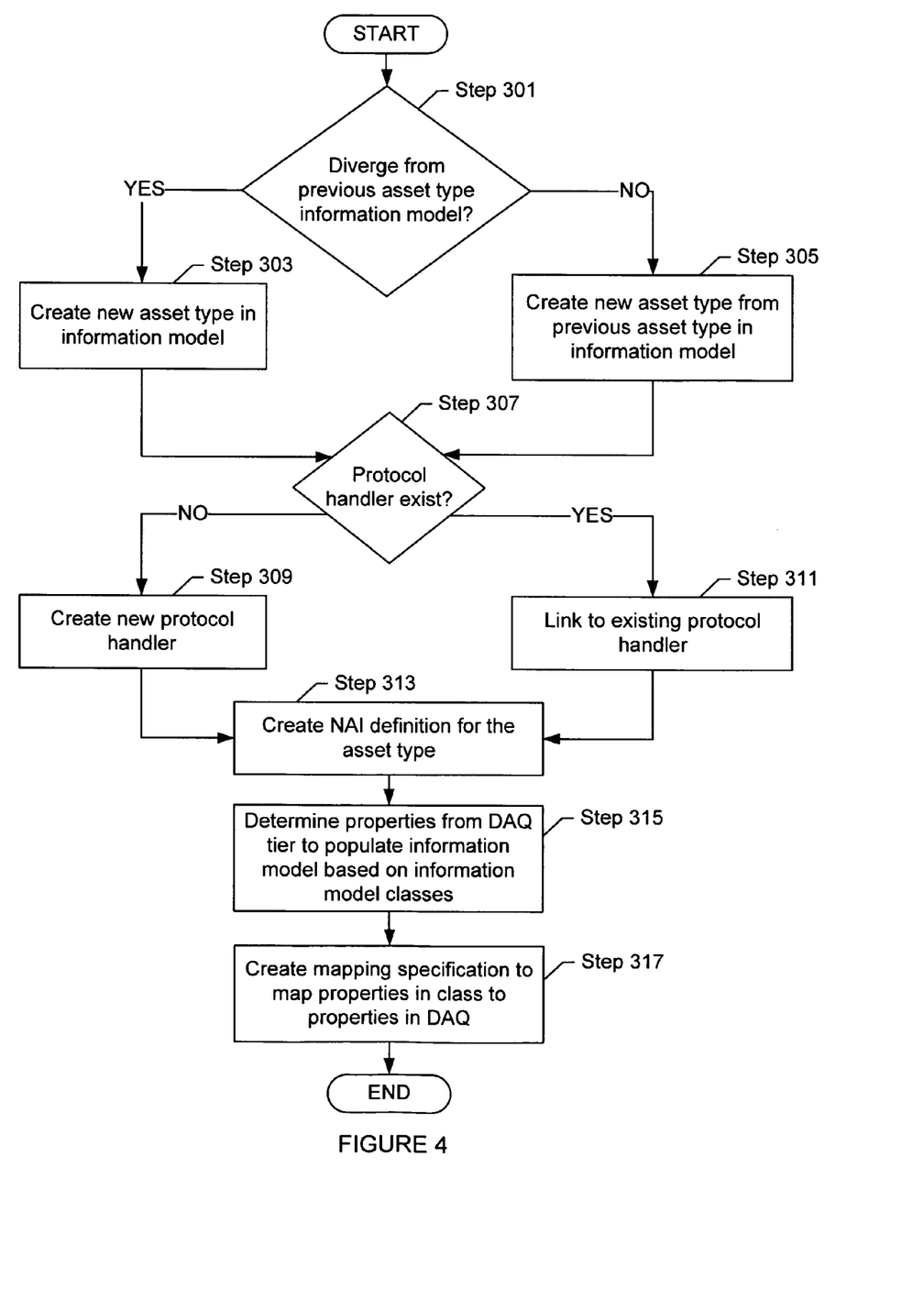
FIG. 4 shows a flowchart of a method for adding a new asset type to the system in accordance with one or more embodiments of the invention.

Also, using the DAQ runtime and the DAQ manager, new assets can be easily added to the system regardless of whether the new assets correspond to a preexisting asset type. If the new asset is of a preexisting asset type, then a new instance of the information model classes for the asset are created and information about the new asset instance is added to the DAQ. Alternatively, if the new asset is of a new asset type, then the system is configured to include the new asset type. FIG. 4 shows a flowchart of a method for adding a new asset type to the system in accordance with one or more embodiments of the invention.

Initially, a determination is made whether the new asset type diverges from a previous asset type in the information model (Step 301). A new asset type diverges from a previous asset type if the components of the new asset type (e.g., operating system, hardware, networking, etc.) are different than any existing asset type already defined in the information model in accordance with one or more embodiments of the invention. Determining whether a new asset diverges from a previously existing asset type can be performed by identifying the components of the new asset and comparing the components with the assets already in the information model.

If the new asset diverges from a previous asset type in the information model, then a new asset type is created from a previous asset type in the information model (Step 303). Specifically, new classes are developed for managing the new asset of the new asset type.

Alternatively, if the new asset does not diverge from a previously existing asset, then a new asset type can be created from a previously existing asset type in the information model (Step 305). Specifically, any preexisting classes in the information model that can be used as a basis for the new asset type may be copied or inherited into the new classes.

After creating the new asset type, an instance of the newly developed classes is instantiated in the information model (not shown).

Continuing with FIG. 4, protocol handlers are also associated with the new asset. Specifically, a determination is made whether the protocol handlers exist for the new asset type (Step 307). Determining whether protocol handlers exist for the new asset can be performed by identifying the NAI of the asset type. Specifically, as part of the information about the asset of the new asset type or the configuration of the asset, the NAI, or interface for managing the asset type is revealed. The NAI specifies the protocols or schemes that are required for managing the asset type. Based on the specified protocols or schemes, a protocol handler can be identified.

If a protocol handler does not exist for the new asset, then a new protocol handler is created (Step 309). Specifically, at this stage, a new protocol handler is developed for the new asset. Developing the protocol handler may include creating any classes or functions for the protocol handler in a programming language in accordance with one or more embodiments of the invention.

Alternatively, if a protocol handler already exists for the asset type, then a link to the protocol handler is created (Step 311). Specifically, the NAI definition in the DAQ runtime links to the protocol handler.

Accordingly, using the newly created protocol handler or a preexisting protocol handler, the NAI definition for the asset is created (Step 313). At this stage, the mechanisms for managing the manageable components of the asset are identified. Based on the manageable components, the NAI definition is developed. Specifically, for each mechanism for managing the asset, a definition is added to the NAI definition for the asset. More specifically, the tags are identified and the information within the tags is populated in accordance with one or more embodiments of the invention. At any stage after creating the NAI definition and before the asset is managed, the DAQ manager may perform the runtime binding of the NAI definition to the DAQ definition. Performing the runtime binding may include, for example, parsing the NAI definition and creating a DAQ definition object for managing the asset using the information in the NAI definition.

In order to manage the asset of the new asset type, the information model instance must be link to the NAI definition. Accordingly, the properties from the DAQ tier to populate the information model are determined based on the information model classes (Step 315). Specifically, the procedures for populating the information model based on the NAI definition are identified.

Using the identified procedures, a mapping specification is created to map the properties in the information model class to the properties in the DAQ (Step 317). Creating the mapping specification may include identifying how the components of the information model correlate to the components of the DAQ. The mapping specification may then be created to reflect the correlation between components.

Figure 5:
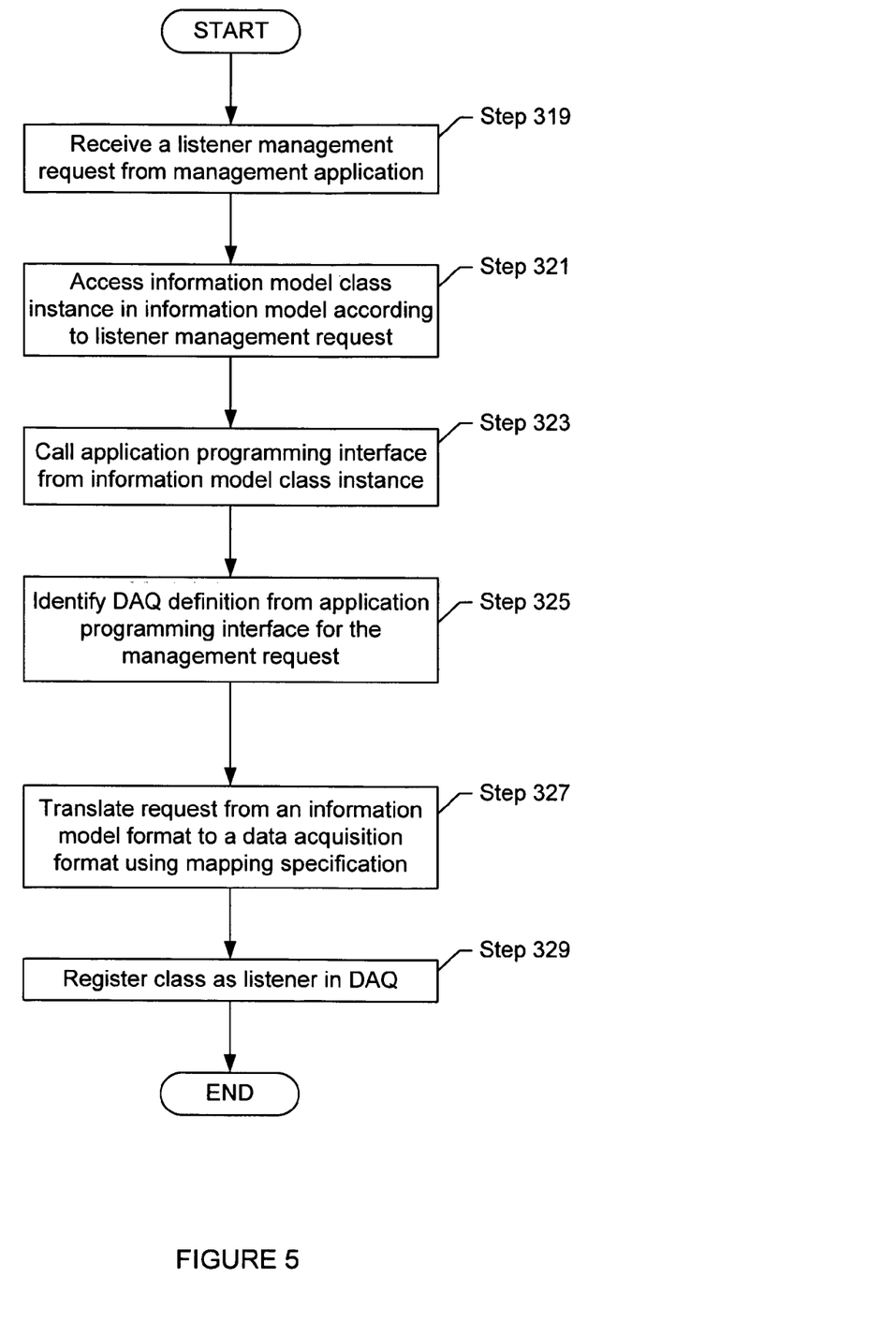
FIG. 5 shows a flowchart of a method for registering listeners in accordance with one or more embodiments of the invention.

Once the mapping specification is created, instances of the information model are added, and NAI definition is bound to the DAQ definition, the asset can be managed according to management requests. In the processes of managing an asset, listeners may be registered for events. FIG. 5 shows a flowchart of a method for registering listeners in accordance with one or more embodiments of the invention.

Initially, a listener management request is received from a management application (Step 319). In one or more embodiments of the invention, the management request is received by the information model in information model format. More specifically, the management application submits a query to the information model using the API of the information model. Further, the listener management request may include parameters. For example, the listener management request may include not only an asset type for management, but also an asset instance and/or a particular property, the frequency that management information should be sent to the management application, whether all management information should be sent or only notifications of changes, or any other type of parameter.

According to the listener management request, the information model class instance is accessed in the information model (Step 321). In particular, the listener management request may include one or more asset identifiers or an asset type identifier. Based on the identifiers and the type of request, information model asset type instance is identified and accessed. At this stage, the information model class instance may be triggered to perform the management function.

By accessing the information model class instance, an API is called from the information model class instance (Step 323). Specifically, the information model class instance includes a call to an API for managing the asset. The API may or may not have any resemblance to the NAI of the asset. In one or more embodiments of the invention, the call to the API is intercepted.

Next, the DAQ definition is identified from the API for the listener management request (Step 325). Identifying the DAQ definition may be performed using virtually any technique known in the art. For example, a mapping specification may be queried for the DAQ definition corresponding to the management request. Alternatively, the DAQ manager may determine the type of management request and the asset type of the management request to identify the DAQ definition for the management request.

Once the DAQ definition is identified, the request is translated from the information model format to the data acquisition format using the mapping specification (Step 329). Specifically, the parameters from the request are formatted according to the requirements of the DAQ definition, and the any remaining necessary formatting changes known in the art may be performed. For example, the information model formatted request may be formatted in an information model language. Accordingly, the language of the request may be translated to a format that a DAQ language can understand.

Once the request is translated and the NAI definition identified, then the information model class instance is registered as a listener in the DAQ (Step 329). Registering a listener may be performed, for example, by the asset factory manager. Specifically, the asset factory manager associated with the identified DAQ definition may add the information model class instance to the list of registered listeners with the parameters specified in the listener management request in accordance with one or more embodiments of the invention.

Those skilled in the art will appreciate that while FIG. 5 shows the listener management request as instigated by a management application, the information model class instance may also instigate the listener management request. Further, the steps performed in FIG. 5 for a listener management request may also be used for a general management request for actively managing an asset. In addition, those skilled in the art will appreciate that changing the parameters and/or unsubscribing from events may be performed in a similar manner as described above.

Figure 6:
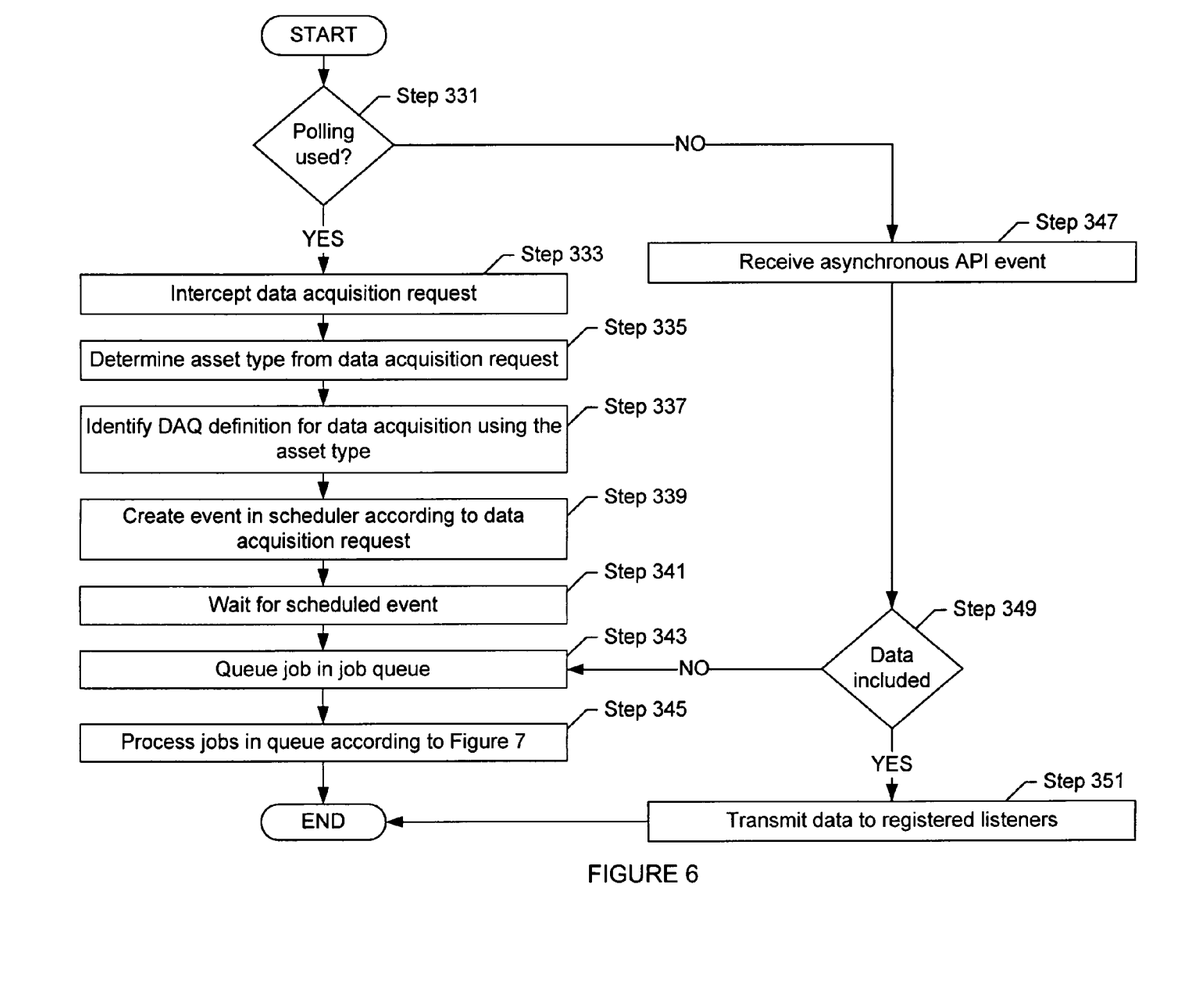
FIG. 6 shows a flowchart of a method for obtaining management information in accordance with one or more embodiments of the invention.

In order for registered listeners to receive management information, the management information is obtained from the assets. FIG. 6 shows a flowchart of a method for obtaining management information in accordance with one or more embodiments of the invention.

Initially, a determination is made whether polling is used (Step 331). Specifically, a determination is made whether or not the NAI of the asset supports asynchronous notification. If the asset does not support asynchronous notification, then polling is used in accordance with one or more embodiments of the invention. Further, in one or more embodiments of the invention, polling is performed at the DAQ runtime. Accordingly, to the information model and the management request, receiving management information would appear as if the asset support asynchronous notification.

Continuing with FIG. 6, if polling is used then a data acquisition request is intercepted (Step 333). Specifically, a data acquisition request from an information model class instance is intercepted.

Next, the DAQ definition is identified for data acquisition using the asset type (Step 337) in accordance with one or more embodiments of the invention. Further, at this stage, the data acquisitions request may be translated from information model format to data acquisition format. Identifying the NAI definition and performing the translation may be performed as described above in FIG. 5.

Those skilled in the art will appreciate that rather than intercepting the data acquisition request, polling may be used to simply transmit information to previously registered listeners. Accordingly, a data acquisition request would not be intercepted unless requested out of sequence. A data acquisition request may be requested out of sequence, for example, if a management application requires immediate access to the management information.

Continuing with FIG. 6, an event in the scheduler is than created according to the data acquisition request (Step 339). The event may specify that the data acquisition is to take place immediately, at a specific point in time (e.g., 3:00 PM GMT, Mar. 15, 2010), periodically (e.g., daily, weekly, hourly, etc.), or at any set of times. The scheduler then schedules the event accordingly.

Next, the event waits until the scheduled time (Step 341). When the time has expired as specified in the scheduler, then a job for the event is queued in the job queue (Step 343). In particular, a job is queued by the scheduler to respond to the data acquisition in accordance with one or more embodiments of the invention. The job includes how to obtain the management information from the asset. Specifically, the job includes the type of asset, the 'topic tag' name, and/or the frequency of the data acquisition.

Alternatively, in one or more embodiments of the invention, the job includes information provided in the DAQ definition. For example, suppose the DAQ definition corresponds to the runtime binding of the following NAI definition snmp://aggie@bevo:port/1.3.6.2.1.1.1.*. In such scenario, in one or more embodiments of the invention, the job definition includes the snmp://aggie@bevo:port/1.3.6.2.1.1.1.*. Those skilled in the art will appreciate that the job may be created when the event is created in the scheduler or directly before the job is queued in the job queue.

Figure 7:
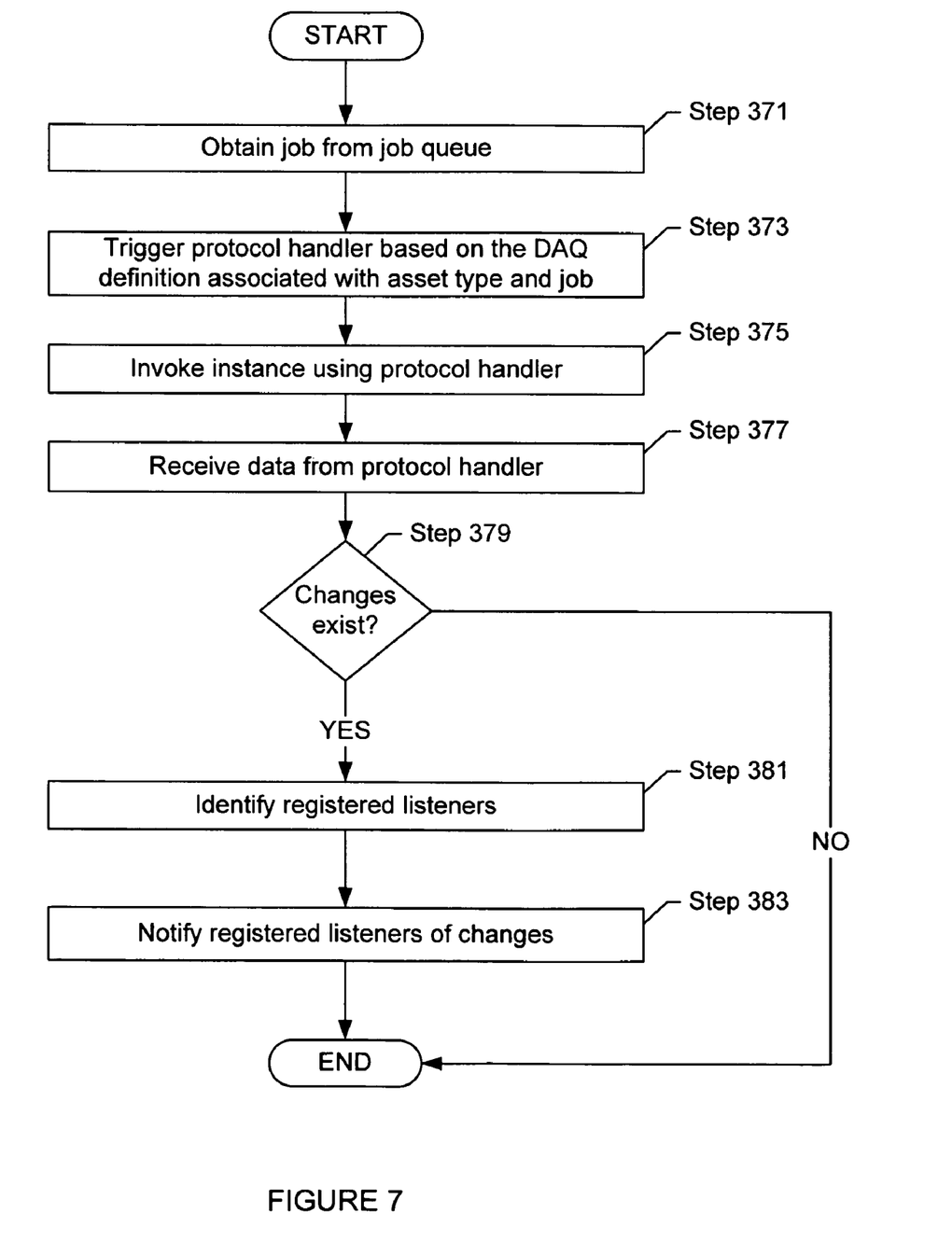
FIG. 7 shows a flowchart of a method for processing a job in accordance with one or more embodiments of the invention.

Next, the jobs in the queue are processed according to FIG. 7 (Step 345) in accordance with one or more embodiments of the invention.

Returning to Step 331 of FIG. 6, if alternatively polling is not used, then an asynchronous API event is received (Step 347). In one or more embodiments of the invention, an asynchronous API event may be received directly from the asset. For example, the DAQ definition may have previously registered for receiving notifications from the asset.

Next, a determination is made whether the asynchronous API event includes data (Step 349). If the asynchronous API event includes data, then the data is transmitted to the registered listeners of the asset (Step 351). Specifically, the registered listeners of the asset are identified. From the identification, the data is translated to information model format in accordance with one or more embodiments of the invention. If the registered listeners correspond to information model class instances, then the data is sent to the information model class instances. In turn, the information model class instances may send the data to one or more management applications.

At any time before transmitting the data to the management application, the data may be compared with previously acquired data that is stored at the DAQ runtime or information model to determine whether changes have occurred. In one or more embodiments of the invention, only the data that changed is sent to the registered listeners and/or management applications.

Continuing with FIG. 6, if as an alternative to data being included in the asynchronous API event, the asynchronous API event only indicates that data acquisition should occur, then a job is queued in the job queue (Step 343) and the job is processed according to FIG. 7.

FIG. 7 shows a flowchart of a method for processing a job in accordance with one or more embodiments of the invention. Initially a job is obtained from the job queue (Step 371). In one or more embodiments of the invention, the job is obtained according to a priority of the job (as described in FIG. 3). Obtaining the job from the job queue may be performed by a thread.

Next, the protocol handler is triggered based on the DAQ definition (Step 341). Specifically, as previously stated, the DAQ definition identifies the protocol handlers and the mechanism for managing the asset using the protocol handlers. Based on the DAQ definition, the protocol handler is triggered with the information about the mechanism for the management. Accordingly an asset instance is invoked using the protocol handler (Step 375). Specifically, the protocol handler uses the NAI that is identified by the NAI definition to invoke the management of the asset instance by the asset. By invoking the asset instance, the asset data is obtained from the asset to the protocol handler and subsequently to the DAQ (Step 377).

After acquiring the data, a determination is made whether changes exist in the data in accordance with one or more embodiments of the invention (Step 371). Specifically, the data may be compared with any previously acquired data of the asset as described above.

If changes do not exist, then the data may optionally be stored and not sent (not shown). Those skilled in the art will appreciate that all data may be sent to the registered listeners rather than just the changes.

Continuing with FIG. 7, if changes do exist, then the registered listeners may be identified (Step 381). Identifying the registered listeners can be performed by the asset factory manager. Further, in one or more embodiments of the invention, the parameters from the registration of the registered listeners may be used to determine whether and how to send the data to the registered listeners.

Next, the registered listeners are notified of changes (Step 383). At this stage, the notification may be in the form of information that changes exist, in the form of the changed data, in the form of a location where the changes may be obtained that is accessible by the DAQ and the registered listeners.

Sending the notification may be performed by sending the notification to the information model class. Further, the notification may be translated for the DAQ format to the information model format using the mapping specification. At this stage, the notification may also be transmitted to the management application from the information model.

In the following example, consider the case in which the asset is a group of computer systems in which the temperature of the processors must be monitored and regulated to prevent failure. In the example, a management application is designed to monitor the temperatures and submit notification to an administrator if there are large changes.

Accordingly, the management application sends a request to the information model to register as a listener for the temperature data. Because the information model does not know the formats or protocols for the different computer systems, the information model registers as a listener to the DAQ. In the request, the information model specifies that only changes matching a certain threshold are to be returned, that the property is the temperature, and the asset type is the different computer systems.

The request is translated to the DAQ format and the appropriate DAQ definition is determined.

The asset factory manager registers the information model class instance according to the parameters specified and creates an event in the scheduler in accordance with one or more embodiments of the invention for each of the computer systems that do not support asynchronous API events. The computer systems that do support asynchronous API events are set to transmit the temperature if the change in temperature matches the threshold.

When the time has elapsed in the scheduler for the scheduled event to occur, then a job is queued. A thread dequeues the job and using the DAQ definition uses the appropriate protocol handler to obtain the temperature from each of the computer systems in which polling is used. The temperature is compared and changes are submitted to the information model class instance. Further, any asynchronous API events for temperature are also sent to the information model class instance.

After receiving the changes, the information model class instance informs the management application of the changes. The management application may then determine how to decrease the computer temperature.

As shown above, the information model and management application are able to receive increased performance benefits by not having to constantly poll the computer system. Further, because the information model is separated from the asset instances, the information model does not have to know anything about the different protocols and methods for obtaining information from the asset instances.

Figure 8:
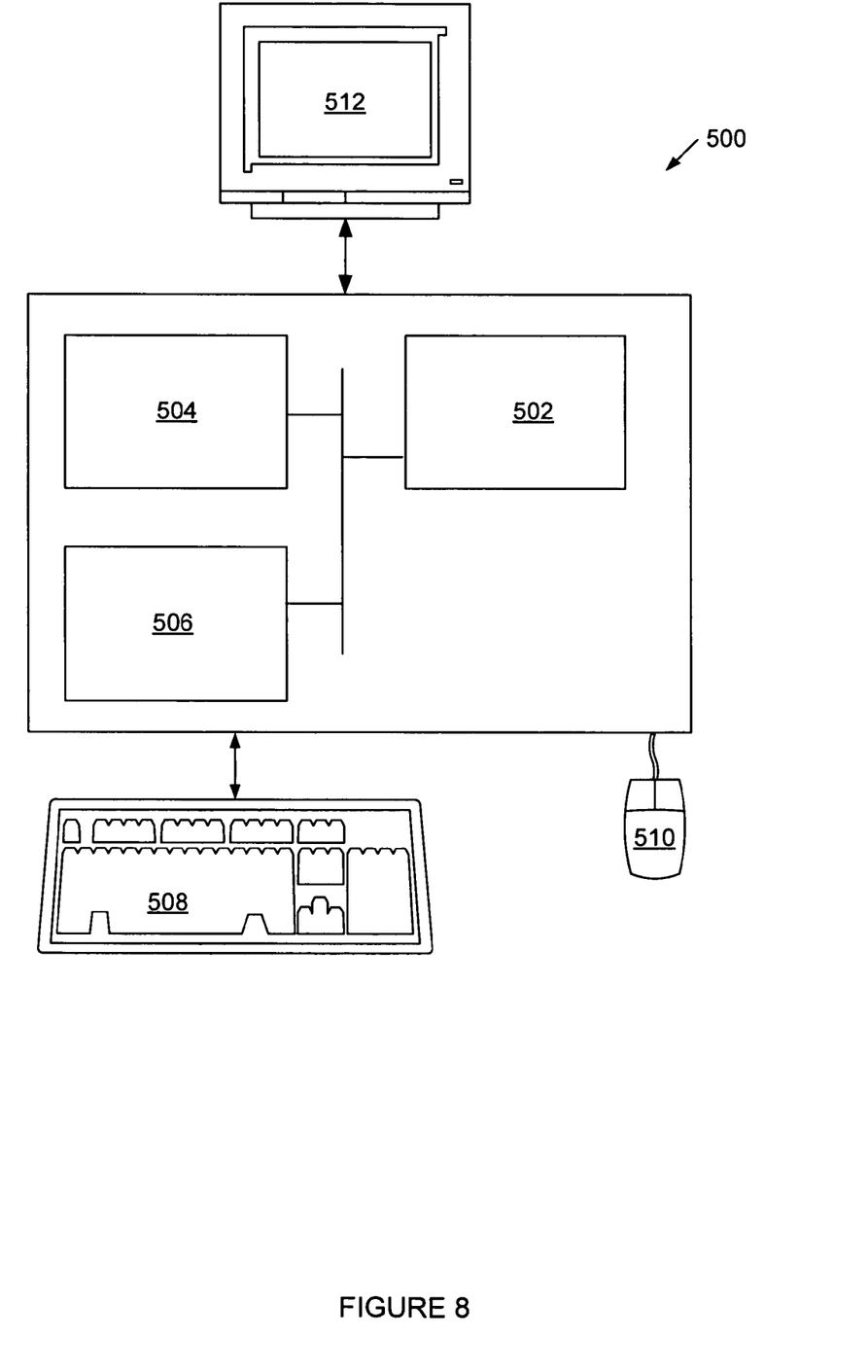
FIG. 8 shows a computer system in accordance with one or more embodiments of the invention.

The invention may be implemented on virtually any type of computer regardless of the platform being used. For example, as shown in FIG. 8, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., NAI definition, DAQ definition, Information model repository, protocol handler repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for easy management of assets. Specifically, embodiments of the invention minimize the amount of framework code required for managing an asset. For example, by only adding metadata definitions to the DAQ runtime in the form of NAI definitions, new assets of new asset types can be easily added to the system. Specifically, when new assets are added to the system, the information model may only be adjusted to add class information for managing the new asset. The specific protocol information for the new asset and NAI specific methods for managing the asset do not need to be added to the information model. Accordingly, embodiments of the invention reduce the barrier of entry for new products to be instrumented and integrated into systems and network management framework.

Further, by separating the information model and the mechanism for obtaining management information about an asset, multiple information model class instances can obtain management information from the DAQ runtime without constant interruption to the asset. Accordingly, without the interruption, the performance of the asset may increase.

Further, embodiments of the invention provide a mechanism whereby the NAI for the asset can be updated as new technologies are developed without unduly affecting the management infrastructure. Specifically, if a protocol handler exists for the updated NAI, then only the definition needs to change for the asset.

In addition, embodiments of the invention provide a mechanism for event-driven notification. Specifically, the information model and management application is able to take advantage of asynchronous API events without having to poll the assets or know the protocols of the assets. More specifically, fewer resources may be consumed by transforming notifications to event driven. The management application is not required to request management information. Moreover, embodiments of the invention take advantage of any existing asynchronous API that is available on the asset.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable storage medium comprising computer readable code that, when executed by a processor, is configured to perform a method for providing management information about an asset, the method comprising:
   obtaining a job from a job queue;
   determining the asset type of the asset from the job;
   triggering a protocol handler based on a data acquisition (DAQ) definition associated with the asset type and the job;
   receiving management information about the asset from the protocol handler;
   identifying at least one registered listener of the management information from the DAQ definition, wherein at least one registered listener comprises an information model class instance; and
   notifying the at least one registered listener of the management information.

2. The computer readable storage medium of claim 1, the method further comprising:
   queuing the job in the job queue.

3. The computer readable storage medium of claim 2, the method further comprising:
   intercepting a DAQ request;
   determining the asset type of the asset from the data acquisition request; and
   creating an event in a scheduler according to the asset type and the DAQ request to create a scheduled event specifying a time to queue the job,
   wherein the job is queued in the job queue at the time specified by the scheduled event.

4. The computer readable storage medium of claim 3, the method further comprising:
   translating the DAQ request from an information model format to a DAQ format, wherein the DAQ definition complies with the data acquisition format,
   wherein the management request is received in the information model format.

5. The computer readable storage medium of claim 1, wherein identifying the DAQ definition is based on the asset type.

6. The computer readable storage medium of claim 1, the method further comprising:
   receiving an asynchronous application programming interface event comprising the management information; and
   transmitting the management information to the at least one registered listener of the management information.

7. The computer readable storage medium of claim 1, the method further comprising:
   receiving a DAQ request from a management application; and
   registering the management application as the at least one registered listener based on the DAQ request.

8. The computer readable storage medium of claim 1, the method further comprising:
   identifying a previous version of the management information; and
   determining whether a change exists from the previous version of the management information after receiving management information about the asset from the protocol handler,
   wherein notifying at least one registered listener of the management information comprises informing the at least one register listener about the change.

9. A system for providing management information about an asset comprising:
   a processor;
   a thread of a factory manager that, when executed by the processor, is configured to:
      obtain a job from a job queue;
      determine the asset type of the asset from the job;
      trigger a protocol handler based on a DAQ definition associated with the asset type and the job; and
      receive management information about the asset from the protocol handler; and
   a DAQ manager that, when executed by the processor, is configured to:

identify at least one registered listener of the management information from the DAQ definition, wherein the at least one registered listener comprises an information model class instance; and notify the at least one registered listener of the management information.

10. The system of claim 9, further comprising:
a scheduler configured to queue the job in the job queue.

11. The system of claim 10, wherein the scheduler is further configured to:
intercept a data acquisition request;
determine the asset type of the asset from the DAQ request; and
create an event in a scheduler according to the asset type and the DAQ to create a scheduled event specifying a time to queue the job,
wherein the job is queued in the job queue at the time specified by the scheduled event.

12. The system of claim 11, further comprising an information model runtime, that when executed by a processor, is configured to:
translate the DAQ request from an information model format to a DAQ format, wherein the DAQ definition complies with the DAQ format, and
wherein the management request is received in the information model format.

13. The system of claim 9, wherein identifying the DAQ definition is based on the asset type.

14. The system of claim 9, wherein the DAQ manager is further configured to:
receive an asynchronous application programming interface event comprising the management information; and
transmit the management information to the at least one registered listener of the management information.

15. The system of claim 9, further comprising:
an information model runtime configured to:
receive a DAQ request from a management application; and
invoke an information model class instance based on the DAQ request,
wherein the DAQ manager is further configured to register the information model class instance as the at least one registered listener based on the DAQ request.

16. The system of claim 9, wherein the DAQ manager is further configured to:
identify a previous version of the management information; and
determine whether a change exists from the previous version of the management information after receiving management information about the asset from the protocol handler,
wherein notifying at least one registered listener of the management information comprises informing the at least one register listener about the change.

17. A distributed computer system having a plurality of nodes, wherein each node comprises a processor and a computer readable medium comprising computer readable code that when executed by the processor is configured to perform a method comprising:
obtaining a job from a job queue;
determining the asset type of the asset from the job;
triggering a protocol handler based on a DAQ definition associated with the asset type and the job;
receiving management information about the asset from the protocol handler;
identifying at least one registered listener of the management information from the DAQ definition, wherein the at least one registered listener comprises an information model class instance; and
notifying the at least one registered listener of the management information,
wherein the protocol handler and the at least one registered listener are distributed across one or more of the plurality of nodes.

18. The distributed computer system of claim 17, wherein the method further comprises:
queuing the job in the job queue; and
creating an event in a scheduler according to the asset type and the DAQ request to create a scheduled event specifying a time to queue the job,
wherein the job is queued in the job queue at the time specified by the scheduled event.

19. The distributed computer system of claim 17, wherein the method further comprises:
identifying a previous version of the management information; and
determining whether a change exists from the previous version of the management information after receiving management information about the asset from the protocol handler,
wherein notifying at least one registered listener of the management information comprises informing the at least one register listener about the change.

20. The distributed computer system of claim 17, wherein the method further comprises:
receiving a DAQ request from a management application; and
registering the management application as the at least one registered listener based on the DAQ request.

* * * * *

UNITED STATES PATENT AND TRADEMARK OFFICE
CERTIFICATE OF CORRECTION

| | | |
|---|---|---|
| PATENT NO. | : 7,711,625 B2 | |
| APPLICATION NO. | : 11/473100 | |
| DATED | : May 4, 2010 | |
| INVENTOR(S) | : Arieh Markel et al. | |

It is certified that error appears in the above-identified patent and that said Letters Patent is hereby corrected as shown below:

In column 6, line 6, delete "instance l" and insert -- instance 1 --, therefor.

In column 6, line 13, delete "class l" and insert -- class 1 --, therefor.

In column 6, line 19-20, delete "instance l" and insert -- instance 1 --, therefor.

In column 6, line 26, delete "instance" and insert -- instance i --, therefor.

In column 9, line 6, delete "1evel," and insert -- level, --, therefor.

Signed and Sealed this
Twelfth Day of July, 2011

David J. Kappos
*Director of the United States Patent and Trademark Office*